United States Patent [19]

Ferguson

[11] 3,781,091
[45] Dec. 25, 1973

[54] ARRANGEMENT FOR RENDERING THE STRUCTURE OF AN OPTICAL IMAGE SUBSTANTIALLY INVISIBLE

[75] Inventor: Eric Tapley Ferguson, Emmasingel, Eindhoven, Netherlands

[73] Assignee: U.S. Philips Corp., New York, N.Y.

[22] Filed: July 12, 1972

[21] Appl. No.: 271,057

[30] Foreign Application Priority Data
July 17, 1971  Netherlands .................... 7109911

[52] U.S. Cl. ................ 350/167, 178/7.85, 350/286
[51] Int. Cl. .............................................. G02b 5/00
[58] Field of Search ...................................... 350/167

[56] References Cited
UNITED STATES PATENTS
2,182,993  12/1939  Moreno ...................... 350/167 UX
2,605,434  7/1952  Homrighous ................. 350/167 X
3,588,326  6/1971  Frohbach ..................... 350/167 UX

*Primary Examiner*—John K. Corbin
*Attorney*—Frank R. Trifari

[57] ABSTRACT

A device by which the structure of an optical image can be rendered substantially invisible. The optical image is made up of a plurality of light-emitting or light-deflecting elements, for example luminescent stripes of a colour television display screen, scanning lines of a television image or elements of a display panel. The arrangement comprises a light-transmitting plate which contains portions of alternately linearly varying the thicknesses. This enables the modulation transfer function for the spatial frequency $1/a\ m^{-1}$ to be made substantially zero and for the spatial frequency $1/2a\ m^{-1}$ to be made a maximum.

4 Claims, 9 Drawing Figures

ARRANGEMENT FOR RENDERING THE STRUCTURE OF AN OPTICAL IMAGE SUBSTANTIALLY INVISIBLE

The invention relates to an arrangement for rendering substantially invisible the structure of an optical image composed of a plurality of light-emitting or light-reflecting elements.

Such elements may be elongate, in particular have the form of parallel stripes. This is the case, for example, in a cathode ray tube for displaying images in which the image display screen is built up from stripes which luminesce in different color. Examples of such tubes are a tube having a color selective electrode in the form of a wire grid and an index-type tube. In these cases the optical image contains a structure in one direction. Another case of the occurrence of parallel stripes is the visibility of the scanning lines of a television image.

In other cases the optical image contains a structure in more than one direction and in particular in two mutually perpendicular directions, for example in the case in which the elements are arranged in rows and columns. This is the case in a panel for displaying images, for example a gas discharge panel or a solid state panel, and in a device composed of a plurality of incandescent lamps. It is also the case in a color tube comprising luminescent stripes in which the structure of the scanning lines is visible.

The disadvantage which occurs in these cases consists in that in the display of an image and in particular of a uniform image portion the structure of the said elements remains visible. This disadvantage cannot always be obviated by diminishing the elements, inter alia because the elements cannot indefinitely be diminished for technological or other reasons.

The invention is based on the following recognition which is illustrated with reference to a stripe structure of the image. Owing to the stripe structure of the image the latter has a given spatial frequency (spatiency). When the stripes all display the same color, the spatial frequency is determined by the distance by which the centers of adjacent stripes are spaced from one another. When the stripes display different color, this holds for the stripes of each color, which also applies to the following discussion. If the said spacing is $a$ meters, a structure having a spatial frequency of $1/a\ m^{-1}$ will be visible. This visibility is obviated in the image when the visibility of a structure having a spatial frequency of $1/a\ m^{-1}$ is suppressed. The highest-frequency information to be displayed occurs when the luminous intensity of succeeding elements of the same color alternately assumes two values. This information, which has a spatial frequency which is half the aforementioned spatial frequency, i.e. $1/2a\ m^{-1}$, is to be suppressed as little as possible. This may be effected by means of a light-transmitting plate which has given light-dispersing properties. Such a plate is required to have a modulation transfer function of value zero for the spatial frequency $1/a\ m^{-1}$ and a maximum modulation transfer function for the spatial frequency $1/2a\ m^{-1}$. The term "modulation transfer function at the spatial frequency S" is to be understood to mean the ratio between the amplitude of the component of spatial frequency S in the output signal and the amplitude of the same component in the input signal. These two conditions are satisfied by a light-transmitting plate which has the property that at least part of a parallel beam of light incident on the plate at right angles in a small area is deflected an an angle $\alpha$ to one side and at the same angle to the other side.

According to the invention the arrangement comprises a light-transmitting plate which in at least one direction has portions of alternately linearly varying thicknesses, the spacing between two successive corresponding portions of the plate being smaller than the spacing between two successive corresponding elements of the image, such that a beam of light is refracted in a number of directions corresponding to the number of different varying thicknesses of the plate. Expressed in terms of spatial frequency, the spatial frequency of the structure of the plate is greater than that of the elements of the image.

The plate may be entirely made up of parts of alternately linearly varying thicknesses. Although in theory this provides the most accurate solution of the problem set, in practice difficulties may arise, firstly because the spacing between the stripes of which the optical image is made up is not exactly the same across the entire image, secondly because the spacing between the plane in which the optical image is formed and the light-transmitting plate is not equal throughout, and thirdly because it must be possible to view the image from different directions. Variations in the spacing between the plane in which the optical image is formed and the light-transmitting plates are equivalent to proportional variation of all the spatial frequencies. This also applies to variation in the viewing angle. In practice the requirement that the plate shall have a modulation transfer function of zero for the spatial frequency $1/a\ m^{-1}$ is replaced by the requirement that the modulation transfer function shall be small for a given band of spatial frequencies about $1/a\ m^{-1}$. If this band exceeds a given width, for example plus or minus 10 percent about $1/a\ m^{-1}$, the aforedescribed structure of the plate can no longer comply with the requirement to be fulfilled. In this case the conditions are satisfied by a light-transmitting plate which has the property that when a parallel beam of light is incident on the plate at right angles, in each small area part of the light beam passes through without deflection, one half of the remainder being deflected at an angle $\alpha$ to one side and the other half being deflected at the same angle to the other side. In particular the light transmitting plate has portions of uniform thickness which are adjoined on either side by a portion of linearly varying thickness.

The thickness of either of the portions which adjoin a portion of uniform thickness either increases linearly or decreases linearly. In the first case the uniform thickness is the smallest thickness of the plates, and in the second case the uniform thickness is the greatest thickness of the plate. When the portions of uniform thickness each have a width of $0.5\ c$ centimeters and the portions of linearly varying thickness each have a width of $0.25\ c$ centimeters, in each small area 50 percent of the light beam is transmitted undeflected, 25 percent is deflected at an angle $\alpha$ to one side and 25 percent is deflected at an angle $\alpha$ to the other side. Such a plate has the property that the modulation transfer function for the spatiency $1/a\ m^{-1}$ is zero. The band of spatial frequencies situated about $1/a\ m^{-1}$ for which the modulation transfer function is small may be increased in that instead of the modulation transfer function for the spatial frequency $1/a\ m^{-1}$ the modulation transfer function for two spatial frequencies on either side of the spatial frequency $1/a \, m^{-1}$ is made zero. In this case, in each small area slightly less than 50 percent of a parallel light beam incident on the plate at right angles is to pass through undeflected, while of the remainder one half is to be deflected at an angle $\alpha$ to one side and the other half is to be deflected at the same angle to the other side. More particularly, the portions of uniform thickness each have a width of $(1 - 2p)c$ meters and the portions of linearly varying thickness each have a width of $pc$ meters, where $c$ being an arbitrary constant and $0.25 \leq p \leq 0.30$. Since the spacing between two successive corresponding portions of the plate is smaller than the spacing between two successive corresponding elements of the image, $c \leq a$.

If the optical image is made up of stripe-shaped elements, the plate includes in particular stripe-shaped portions. Thus it has a corrugated or ribbed structure. When the stripe-spaced portions of the image extend parallel to the stripe-shaped portions of the plates, in given cases moire patterns may occur owing to the interference between the stripe structure of the image and the corrugated structure of the plate. This is the case when the difference between the spatial frequency of the corrugated structure or a multiple thereof on the one hand and the spatial frequency of the stripe structure or a multiple thereof on the other hand is smaller than, or equal to, the spatial frequency of the highest-frequency information in the image. This occurrence of moire patterns may be prevented by maintaining a given minimum angle between the stripe-shaped elements of the image and the stripe-shaped portions of the plate. In particular, the angle between the stripe-shaped elements of the image and the stripe-shaped portions of the plate is shown so that no moire patterns occur at a spatial frequency lower than $1/2a \, m^{-1}$. Obviously this angle depends upon the value of $a$ in the image and upon the value of $c$, the corrugation spacing, used for the plate. Furthermore the occurrence of moire patterns may be prevented by using a plate the corrugated structure of which has no periodicity. In particular, in the case of an optical image having a periodic, or substantially periodic, structure the corresponding portions of the light-transmitting plate must have an at least substantially a periodic structure.

If the optical image has a structure in more than one direction, a superposition of two corrugated structures is to be effected. This may be achieved by using a plurality of light-transmitting plates which each have a corrugated structure as described. Alternatively a superposition of the two corrugated structures in a single light-transmitting plate may be effected. This may simply be achieved by providing the plates with a corrugated structure on either major surface.

An example of an optical image which has a structure in more than one direction is a color television image which is obtained by means of a color television display tube of the type having luminescent stripes, when the scanning lines are visible in the image and are inclined at an angle to the luminescent stripes. This angle usually is 90°, in which case the corrugated structures are at right angles to one another, one being corrugated with the luminescent stripes and the other with the scanning lines. Another example of an optical image having a structure in two usually perpendicular directions is an image obtained by means of an image display device which is made up of elements which extend in two directions, for example a gas discharge panel, a solid state panel or a device comprising a plurality of incandescent lamps. In these examples, in which the structures are at an angle of substantially 90° to one another, the structure of the image may be rendered substantially invisible in a particular manner, i.e., by means of a light-transmitting plate having a single corrugated structure which is arranged at a suitable angle to the directions of the two structures of the image, namely in the direction of a diagonal of the rectangles foremd by the structures. Although this solution is simple, it is less sufficient than the solution in which two corrugated structures are used, because in the image transmitted by the light-transmitting plates periodic structure is still produced which has a spatiency smaller than when two corrugated structures are used to render the image structure invisible.

A further example of an optical image which has a structure in more than one direction is a color television image obtained by means of a color television display tube of the shadow mask type. In such a tube the image display screen is made up of luminescent dots which are situated on lines which make angles of 60° with one another. In this case the image has a structure in three directions. To render this structure invisible two corrugated structures are required which make an angle of 60° with one another.

Embodiments of the invention will now be described, by way of example, with reference to the accompanying diagrammatic drawings, in which:

FIG. 1b shows the dispersion figure of the plate shown in FIG. 1a,

FIG. 1c is the modulation transfer function of the plate shown in FIG. 1a,

FIG. 2b shows the dispersion figure of the plate shown in FIG. 2a,

FIG. 2c is the modulation transfer function of the plate shown in FIG. 2a,

FIG. 3b is the dispersion figure of the plate shown in FIG. 3a, and

FIG. 3c shows the modulation transfer function of the plate shown in FIG. 3a.

Figure 1C:
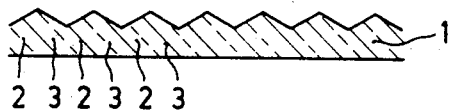
Figure 1A:
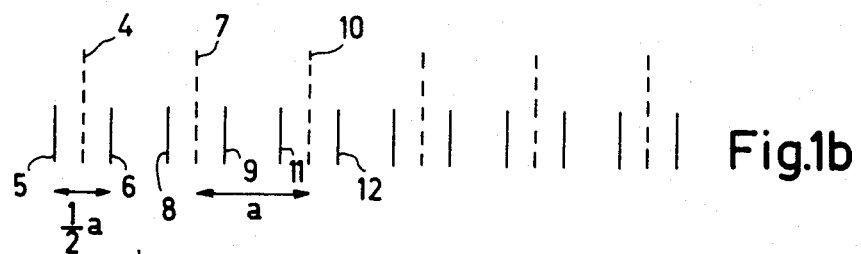
FIG. 1a is a sectional view of a light-transmitting plate.

Referring now to FIG. 1a, there is shown a light-transmitting plate 1 one major surface of which is plane and which is entirely made up of portions 2 and 3 having alternately linearly varying thicknesses and the same width. This plate has the property that when a parallel beam of light is incident on it at right angles in each small area 50 percent of the light is deflected to one side at an angle $\alpha$ and 50 percent is deflected to the other side at an angle $\alpha$.

Figure 1B:
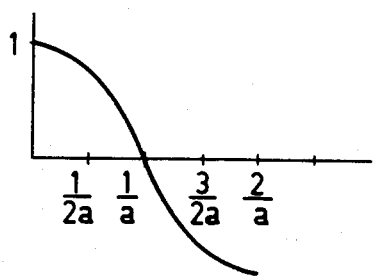

FIG. 1b shows the dispersion figure of the plate 1. The spacing between the lines of an image is plotted on the horizontal axis and the luminous intensity is plotted on the vertical axis. Lines 4, 7 and 10, which are spaced from one another by a distance $a$ and are shown as broken lines, form the structure of an optical image. The light-transmitting plate 1 has a thickness such, as the angle $\alpha$ at which the light beam is deflected is such, that with the given distance between the plate and the image the displacement of the lines of the image is exactly ¼a, so that the structure of a line pattern 4, 7, 10 is rendered invisible. The line 4 is dispersed by the plate 1 to form two lines 5 and 6 which each have one half of the intensity of the original line and are spaced apart a distance of ½a. The structure comprising the lines 4, 7, 10 which are spaced apart a distance $a$ is dispersed by the plate 1 to a structure comprising lines 5, 6, 8, 9, 11, 12 which are spaced apart a distance ½a and each have one half of the intensity of the relevent original line; the structure having the spacing $a$ is no longer present in the image viewed.

FIG. 1c shows the modulation transfer function of the plate 1. The spatial frequency is plotted on the horizontal axis. The graph shows that for a spatial frequency 1/a the modulation transfer function is zero. i.e., the ratio between the amplitude of the component at a spatial frequency 1/a in the output signal (the image viewed) and the amplitude of the same component in the input signal (the original image) is zero, in other words the amplitude of the component at spatial frequency 1/a in the image viewed is zero. In this embodiment the modulation transfer function for the spatial frequency 1/2a is 0.7071.

Figure 2A:
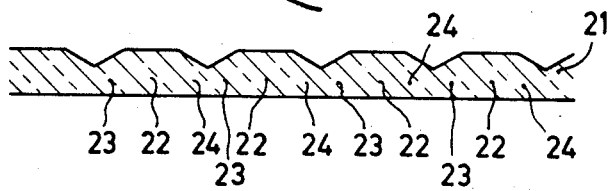
FIG. 2a is a sectional view of another light-transmitting plate.

FIG. 2a is a cross-sectional view of a light-transmitting plate 21 one major surface of which is plane throughout while the other major surface is partially plane. Thus the plate is made up of portions of uniforms thickness 22 which are flanked on either side by portions 23 and 24 of alternately linearly varying thickness. The sum of the width of the portion 23 and of a portion 24 is equal to the width of a portion 22. This plate has the property that when a parallel light beam is incident on the plate at right angles in each small area 50 percent of the light beam passes through undeflected while one half of the remainder is deflected at an angle $\alpha$ to one side and the other half is deflected at the same angle to the other side.

Figure 2B:
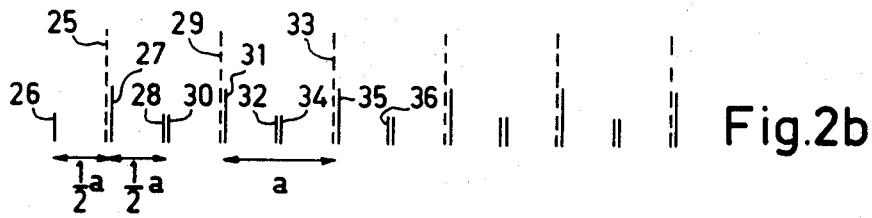

FIG. 2b shows the dispersion figure of the plate 21. The spacing between the lines of an image is plotted on the horizontal axis and the intensity of the line is plotted on the vertical axis. Lines 25, 29, 33, which are spaced apart by a distance $a$ and are shown as broken lines, form the structure of an optical image. The light-transmitting plate 21 has a thickness such, and the angle $\alpha$ at which part of the light beam is deflected is such, that at the given distance between the plate and the image the displacement of the parts of the lines of the image is exactly an ½a, so that the structure of the line pattern 25, 29, 33 is rendered invisible. The line 25 is dispersed by the plate 21 into three lines 26, 27 and 28, the lines 26 and 28 each having one quarter of the intensity and the line 27 having one half of the intensity. These lines are spaced apart by a distance of ½a. The line 27 in the part of the light beam which is not deflected, so that its location coincides with that of the line 25. For clarity, in the Figures the lines 25 and 27 are slightly shifted with respect to one another. The line 29 is dispersed by the plate 21 into three lines 30, 31 and 32, the lines 30 and 32 each having one quarter of the intensity and the line 31 having one half of the intensity. These lines also are spaced apart by a distance ½a. For the same reason as stated hereinbefore with respect to the lines 25 and 27, in the Figure the lines 29 and 31 are slightly shifted with respect to one another. In actual fact the location of a line 30 coincides with that of the line 28, but for clarity the lines 28 and 30 are shown slightly shifted with respect to one another in the Figure. The structure comprising the lines 25, 29, 33 spaced apart by a distance $a$ is dispersed by the plate 21 to a structure of lines ( . . . +26), 27 (28 + 30), 31, (32 + 34), 35, (36 + . . . ) spaced apart by a distance ½a. When the lines 25, 29, 33 have equal intensities, the structure of lines ( . . . . . + 26), 27, (28 + 30), 31, (32 + 34), 35, (36 + . . . ) after summation has one half of this intensity. The structure having a spacing $a$ is no longer present in the image viewed.

Figure 2C:
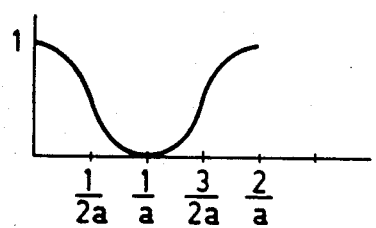

FIG. 2c shows the modulation transfer function of the plate 21. The spatial frequency is plotted on the horizontal axis. The graphs shows that for the spatial frequency 1/a the modulation transfer function is zero. For the spatial frequency 1/2a the modulation transfer function is 0.5. This value is lower than that shown in the graph of FIG. 1c, however, as FIGS. 1c and 2c show, in FIG. 2c the curve at the location of the spatial frequency 1/a is less steep than in FIG. 1c, so that the plate 21 has the advantage that the band of spatial frequencies about 1/a for which the modulation transfer function is small is larger than in the case of the plate 1.

Figure 3A:
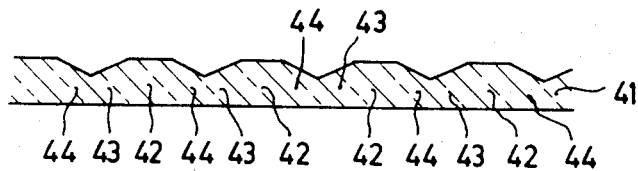
FIG. 3a is a cross-sectional view of a light-transmitting plate.

FIG. 3a is a sectional view of a light-transmitting plate 41 one major surface of which is plane throughout and the other major surface of which is partially plane. Thus the plate is made up of portions of uniform thickness 42 adjoined on either side by portions 43 and 44 of alternately linearly varying thickness. The ratio between the widths of the portions 43, 42 and 44 is 27 : 46 : 27. This plate has the property that when a parallel beam of light is incident on the plate at right angles in each small area 46 percent of the light beam passes through undeflected, whilst one half of the remainder is deflected at an angle $\alpha$ to one side and the other half is deflected at the same angle to the other side.

Figure 3B:
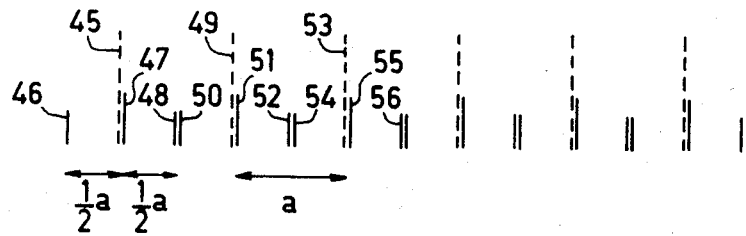

FIG. 3b shows the dispersion figure of the plate 41. The spacing between the lines of an image is plotted on the horizontal axis and their intensity is plotted on the vertical axis. The lines 45, 49, 53, which are spaced apart by a distance $a$ and are shown by broken lines, form the structure of an optical image. The light-transmitting plate 41 has a thickness such, and the angle $\alpha$ at which part of the light beam is deflected is such, that with the given distance between the plate and the image the displacement of the parts of the lines of the image is exactly ½a, so that the structure of the line pattern 45, 49, 53 is rendered substantially invisible. The line 45 is dispersed by the plate 41 into three lines 46, 47, 48, the lines 46 and 48 each having slightly more than one quarter of the intensity and the line 47 having slightly less than one half of the intensity. These lines are spaced apart by a distance ½a. The line 47 is the part of the light beam which passes through undeflected, so that the location of the line 47 coincides with that of the line 45. For clarity, in the Figure the lines 45 and 47 are shown slightly shifted with respect to one another. The line 49 is dispersed by the plate 41 into three lines 50, 51 and 52, the lines 50 and 52 each having slightly more than one quarter of the intensity and the line 51 having slightly less than one half of the intensity. These lines also are spaced apart by a distance ½a. For the same reason as stated hereinbefore with respect to the lines 45 and 47, in the Figure the lines 49 and 51 are shown slightly shifted with respect to one another. In actual fact the location of the line 50 coincides with that of the line 48, however, for clarity the lines 48 and 50 are shown in the Figure slightly shifted with respect to one another. The structure of the lines 45, 49, 53 which are spaced apart by a distance $a$ is dispersed by the plate into a structure of lines ( . . . . 46), 47, (48 + 50), 51(52 + 54), 55, (56 +. . . . ) which are spaced apart by a distance ½$a$. If the lines 45, 49, 53 have equal intensities, the structure of lines ( . . . . . . + 46), 47, (48 + 50), 51, (52 + 54), 55, (56 +. . . . ) after summation have intensities of alternately 54 percent and 46 percent. The structure having a spacing $a$ is present to no more than 8 percent in the image viewed.

Figure 3C:
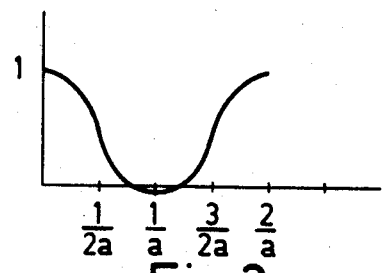

FIG. 3c shows the modulation transfer function of the plate 41. The spatial frequency is plotted on the horizontal axis. The graph shows that the spatial frequency 1/$a$ the modulation transfer function is − 0.08 and for the spatial frequencies on either side thereof it is sero. For the spatial frequency 1/2$a$ the modulation transfer function in this case is 0.46. This value is lower than that in the graph of FIG. 2c, however, as FIGS. 2c and 3c show, the band of spatial frequencies about 1/$a$ for which the modulation transfer function is small is greater in FIG. 3c than in FIG. 2c.

What is claimed is:

1. Arrangement for rendering substantially invisible the structure of an optical image made up of a plurality of light-emitting elements, comprising a light-transmitting plate having portions of uniform thickness flanked on either side by portions of alternating varying thicknesses extending in at least one direction, the spacing between two successive portions of the plate being smaller than the spacing between two successive corresponding elements of the image, the portions of uniform thickness having a width of $(1 − 2p)c$ meters and the portions of linearly varying thickness each having a width of $pc$ meters where $0.25 \leq p \leq 0.30$, $c$ being an arbitrary constant, whereby a beam of light is refracted in a number of directions corresponding to the number of different varying thicknesses of the plate.

2. Arrangement as claimed in claim 1, wherein the optical image in a given direction contains a substantially periodic structure, wherein the corresponding portions of the light-transmitting plate is a given direction form a substantially periodic structure, the angle between the two directions being such that the moire patterns due to the interference of the structures are substantially invisible.

3. Arrangement as claimed in claim 1, wherein the optical image contains a periodic or substantially periodic structure, and wherein the corresponding portions of the light-transmitting plate form a substantially aperiodic structure.

4. Arrangement as claimed in claim 1 wherein in order to render substantially invisible two mutually substantially perpendicular structures of an optical image the light-transmitting plate in one direction comprises parts of alternately linearly varying thicknesses, the direction of the structure of the light-transmitting plate being substantially parallel to the direction of a diagonal of the rectangles formed by the structures of the optical image.

* * * * *

PO-1050
(5/69)

UNITED STATES PATENT OFFICE
CERTIFICATE OF CORRECTION

Patent No. 3,781,091          Dated December 25, 1973

Inventor(s)   ERIC TAPLEY FERGUSON

It is certified that error appears in the above-identified patent and that said Letters Patent are hereby corrected as shown below:

ON THE TITLE PAGE

In the Abstract, line 9, after "varying" cancel "the";

IN THE SPECIFICATION

Col. 1, line 14, "selective" should be --selecting--;

line 44, "color" should be --colors--;

Col. 3, line 46, "a periodic" should be --aperiodic--;

Col. 7, line 15, after "that" insert --for--;

Signed and sealed this 14th day of May 1974.

(SEAL)
Attest:

EDWARD M. FLETCHER, JR.
Attesting Officer

C. MARSHALL DANN
Commissioner of Patents